United States Patent
Nam et al.

(10) Patent No.: US 11,888,662 B2
(45) Date of Patent: *Jan. 30, 2024

(54) TECHNIQUES FOR WIRELESS COMMUNICATIONS USING MULTIPLE CYCLIC PREFIX TYPES

(71) Applicant: QUALCOMM Incorporated, San Diego, CA (US)

(72) Inventors: Wooseok Nam, San Diego, CA (US); Alexandros Manolakos, Escondido, CA (US); Tao Luo, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,011

(22) Filed: Nov. 8, 2021

(65) Prior Publication Data

US 2022/0116943 A1 Apr. 14, 2022

Related U.S. Application Data

(63) Continuation of application No. 16/271,254, filed on Feb. 8, 2019, now Pat. No. 11,172,481.

(60) Provisional application No. 62/629,355, filed on Feb. 12, 2018.

(51) Int. Cl.
*H04L 27/26* (2006.01)
*H04W 72/0446* (2023.01)

(52) U.S. Cl.
CPC ...... *H04L 27/2602* (2013.01); *H04L 27/2607* (2013.01); *H04W 72/0446* (2013.01)

(58) Field of Classification Search
CPC .......... H04W 72/0446; H04W 72/042; H04W 72/044; H04W 72/0406; H04W 48/12; H04W 56/001; H04L 27/2607; H04L 27/2602; H04L 27/26025; H04L 5/0048; H04L 5/0092

See application file for complete search history.

(56) References Cited

U.S. PATENT DOCUMENTS

| | | |
|---|---|---|
| 8,135,088 B2 | 3/2012 | Palanki et al. |
| 8,565,082 B1 | 10/2013 | Vargantwar et al. |
| 11,172,481 B2 | 11/2021 | Nam et al. |

(Continued)

FOREIGN PATENT DOCUMENTS

| | | |
|---|---|---|
| CN | 105191195 A | 12/2015 |
| WO | WO-2006096784 | 9/2006 |

(Continued)

OTHER PUBLICATIONS

International Preliminary Report on Patentability—PCT/US2019/017519 The International Bureau of WIPO—Geneva, Switzerland, dated Aug. 27, 2020.

(Continued)

*Primary Examiner* — Ricardo H Castaneyra

(57) ABSTRACT

Aspects of the present disclosure describe receiving a first communication according to a first timeline, wherein the first timeline is based on a first cyclic prefix (CP) type, and receiving a second communication according to a second timeline, where the second timeline is based on a second CP type, and where the second communication is multiplexed with the first communication in the same slot.

30 Claims, 9 Drawing Sheets

(56) References Cited

U.S. PATENT DOCUMENTS

| | | |
|---|---|---|
| 2010/0074244 A1 | 3/2010 | Luo et al. |
| 2012/0014286 A1 | 1/2012 | Wang et al. |
| 2015/0256308 A1 | 9/2015 | Ma et al. |
| 2015/0358983 A1 | 12/2015 | Frenger et al. |
| 2015/0365218 A1 | 12/2015 | Yang et al. |
| 2017/0187416 A1 | 6/2017 | Kim et al. |
| 2017/0331658 A1 | 11/2017 | Chen et al. |
| 2019/0053227 A1 | 2/2019 | Huang et al. |
| 2019/0191433 A1 | 6/2019 | Park et al. |
| 2020/0275417 A1 | 8/2020 | Takeda et al. |

FOREIGN PATENT DOCUMENTS

| | | |
|---|---|---|
| WO | 2016119890 A1 | 8/2016 |
| WO | 2017196684 | 11/2017 |

OTHER PUBLICATIONS

International Search Report and Written Opinion—PCT/US2019/017519—ISA/EPO—dated May 14, 2019.
Taiwan Search Report—TW108104397—TIPO—dated Apr. 21, 2022.
LG Electronics: "Multiplexing NCP and ECP", R1-1710358, 3GPP TSG RAN WG1 Meeting Ad-Hoc, Qingdao, P.R. China Jun. 27-30, 2017, 3 Pages.
Qualcomm Incorporated: "NR Numerology Scaling and Alignment", 3GPP TSG-RAN WG1 #86-BIS, R1-1610131-NR Numerology Scaling Andalignment, 3rd Generation Partnership Project, Mobile Competence Centre, 650, Route Deslucioles, F-06921 Sophia-Antipolis Cedex, France, vol. RAN WG1, No. Lisbon, Portugal, Oct. 10, 2016-Oct. 14, 2016 Oct. 9, 2016, XP051150154, pp. 1-5.

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| NCP Slot format 27 (in NR SFI table) | D | D | D | X | X | X | X | X | X | X | X | U | U | U |

600

| | 0 | 1 | 2 | 3 | 4 | 5 | 6 | 7 | 8 | 9 | 10 | 11 |
|---|---|---|---|---|---|---|---|---|---|---|---|---|
| ECP Slot format 27 | D | D | D | X | X | X | X | X | X | U | U | U |

602

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| NCP Slot format 55 (in NR SFI table) | D | D | X | U | U | U | U | D | D | X | U | U | U | U |

610

| | 0 | 1 | 2 | 3 | 4 | 5 | 6 | 7 | 8 | 9 | 10 | 11 |
|---|---|---|---|---|---|---|---|---|---|---|---|---|
| ECP Slot format 55 | D | D | X | U | U | U | D | D | X | U | U | U |

TECHNIQUES FOR WIRELESS COMMUNICATIONS USING MULTIPLE CYCLIC PREFIX TYPES

CLAIM OF PRIORITY UNDER 35 U.S.C. § 119

The present application is a Continuation of U.S. patent application Ser. No. 16/271,254, entitled "TECHNIQUES FOR WIRELESS COMMUNICATIONS USING MULTIPLE CYCLIC PREFIX TYPES" filed Feb. 8, 2019, which claims priority to Provisional Patent Application No. 62/629,355, entitled "TECHNIQUES FOR WIRELESS COMMUNICATIONS USING MULTIPLE CYCLIC PREFIX TYPES" filed Feb. 12, 2018, which are assigned to the assignee hereof and hereby expressly incorporated by reference herein for all purposes.

BACKGROUND

Aspects of the present disclosure relate generally to wireless communication systems, and more particularly, to the use of cyclic prefix (CP) in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes receiving a first communication according to a first timeline, wherein the first timeline is based on a first cyclic prefix (CP) type, receiving a second communication according to a second timeline, where the second timeline is based on a second CP type, and where the second communication is multiplexed with the first communication in the same slot, decoding the first communication based on a first length of the first CP type, and decoding the second communication based on a second length of the second CP type.

In another example, an apparatus for wireless communication is provided that includes a transceiver, a memory configured to store instructions, and one or more processors communicatively coupled with the transceiver and the memory. The one or more processors are configured to receive a first communication according to a first timeline, wherein the first timeline is based on a first CP type, receive a second communication according to a second timeline, where the second timeline is based on a second CP type, and where the second communication is multiplexed with the first communication in the same slot, decode the first communication based on a first length of the first CP type, and decode the second communication based on a second length of the second CP type.

According to an example, an apparatus for wireless communication is provided that includes means for receiving a first communication according to a first timeline, wherein the first timeline is based on a first CP type, means for receiving a second communication according to a second timeline, where the second timeline is based on a second CP type, and where the second communication is multiplexed with the first communication in the same slot, means for decoding the first communication based on a first length of the first CP type, and means for decoding the second communication based on a second length of the second CP type.

In another example, a computer-readable medium is provided including code executable by one or more processors for wireless communications. The code includes code for receiving a first communication according to a first timeline, wherein the first timeline is based on a first CP type, code for receiving a second communication according to a second timeline, where the second timeline is based on a second CP type, and where the second communication is multiplexed with the first communication in the same slot, code for decoding the first communication based on a first length of the first CP type, and code for decoding the second communication based on a second length of the second CP type.

In another example, a method for wireless communication is provided. The method includes multiplexing, within a slot, a first communication based on a first CP type and a second communication based on a second CP type, and transmitting, within the slot, the first communication based on a first timeline and the second communication based on the second timeline.

In another example, an apparatus for wireless communication is provided that includes a transceiver, a memory configured to store instructions, and one or more processors communicatively coupled with the transceiver and the memory. The one or more processors are configured to multiplex, within a slot, a first communication based on a first CP type and a second communication based on a second CP type, and transmit, within the slot, the first communication based on a first timeline and the second communication based on the second timeline.

In another example, an apparatus for wireless communication is provided including means for multiplexing, within a slot, a first communication based on a first CP type and a second communication based on a second CP type, and means for transmitting, within the slot, the first communication based on a first timeline and the second communication based on the second timeline.

In another example, a computer-readable medium is provided including code executable by one or more processors for wireless communications. The code includes code for multiplexing, within a slot, a first communication based on a first CP type and a second communication based on a second CP type, and code for transmitting, within the slot, the first communication based on a first timeline and the second communication based on the second timeline.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 6 illustrates examples of slot formats, in accordance with various aspects of the present disclosure;

DETAILED DESCRIPTION

Figure 1:
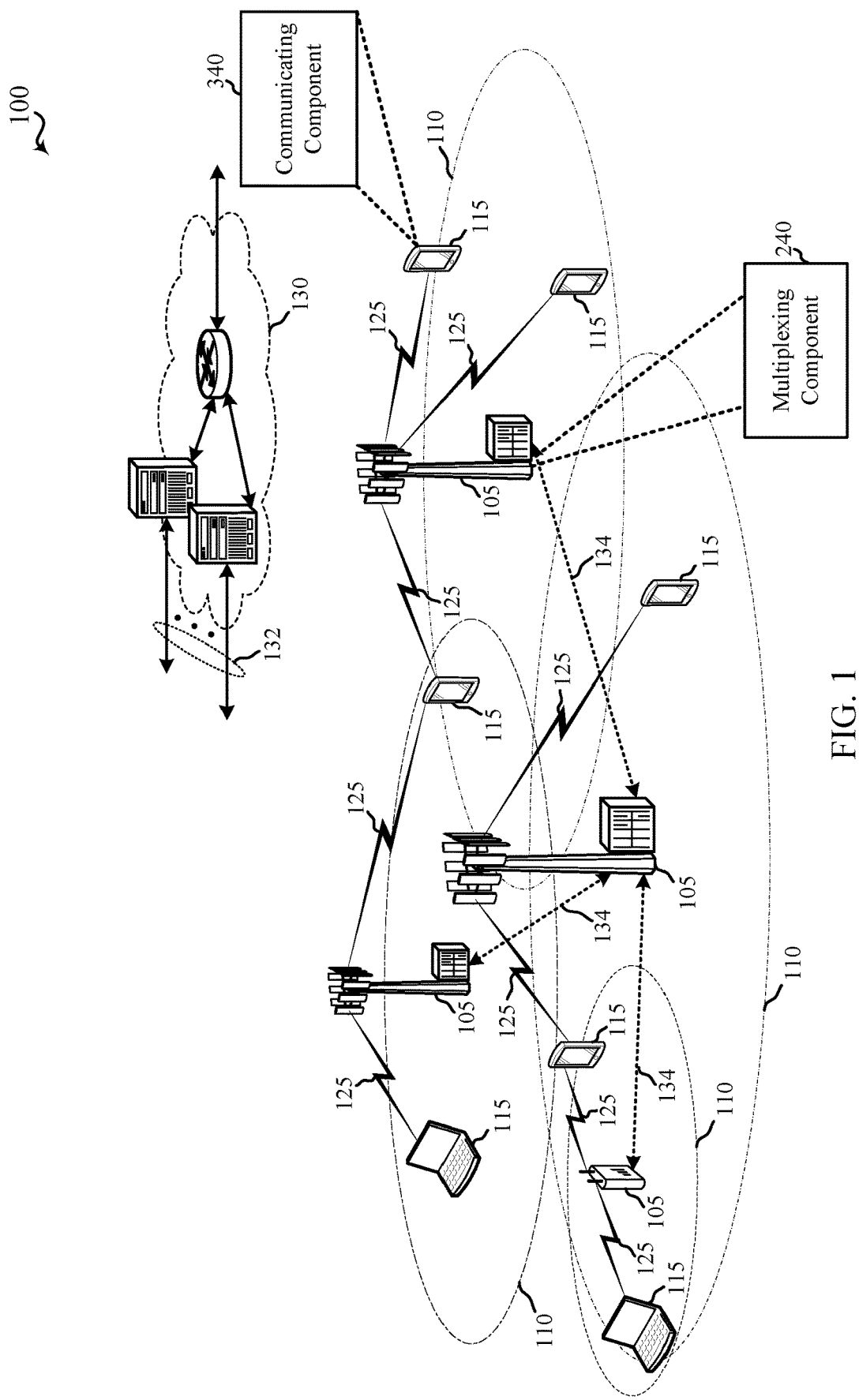
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to supporting multiple cyclic prefix (CP) types in wireless communications. As described, nodes in a wireless network, such as a fifth generation (5G) new radio (NR) configured network, can be configured with different CP types for different links, different signals transmitted over the different links, etc. In an example, a node can be configured to communicate (e.g., transmit or receive) signals with one or more other nodes using a different CP type for each of at least two signals, where using the different CP type may result in a different timeline for the communications as well. For example, a base station can transmit one or more broadcast signals using a normal CP and can multiplex, with the one or more broadcast signals, one or more unicast signals that use an extended CP. In this example, a user equipment (UE) or other node can receive the one or more broadcast signals and/or unicast signals, which can be multiplexed (e.g., in a given slot), and may each use a different CP type. In an example, a slot format configuration for the normal CP and extended CP communications can be coordinated to provide a desirable level of compatibility to minimize conflicting communication directions (e.g., uplink vs. downlink) between symbols in the slot.

For example, NR UEs can be semi-statically configured with a specific numerology (e.g., numerology can refer to a CP overhead and/or subcarrier spacing (SCS)), where NR can support extended CP at least for 60 kilohertz (kHz) SCS. In this configuration, for example, one slot can include 12 orthogonal frequency division multiplexing (OFDM) symbols. NR can also support normal CP where one slot can include 14 OFDM symbols. Additionally, in NR, uplink and downlink can be configured with different CP types (e.g., normal or extended CP). Additional configurations for using CP may be desired.

In addition, slot format configuration for wireless networks such as 5G NR can be semi-static and group-specific. Each slot can include a plurality of symbols, where each symbol can be configured for either downlink, uplink, or flexible communications. The slots configured for flexible communications can be dynamically reconfigured as downlink or uplink in a dynamic and/or UE-specific manner (e.g., by using group common physical downlink control channel (GC-PDCCH) to dynamically configure the flexible symbols). Additionally, for example, CP type or length (e.g., normal CP, extended CP, etc.) configuration can be semi-static and UE-specific, and different CP types can be associated with different timelines (e.g., a different number of symbols in a similar length slot, where a timeline can correspond to the number of symbols in a slot, a corresponding duration for the symbols or slot, etc.). In one specific example, some signals, such as primary synchronization signal (PSS), secondary synchronization signal (SSS), multicast physical downlink shared channel (PDSCH), etc., may be configured to use normal CP while other unicast transmissions maybe configured with extended CP in the same slot. This can result in multiplexing of normal CP and extended CP communications in the same slot. Normal CP slot formats can be based on using a first number of OFDM symbols (e.g., 14) per slot, whereas extended CP slot formats can be based on using a second number of OFDM symbols (e.g., 12) per slot, which can result in different communication timelines per slot.

Aspects described herein relate to multiplexing normal CP and extended CP communications, which may include adapting a slot format to use with one CP type based on the slot format defined for another CP type, where the slot formats may be based on different timelines. Adapting the slot format using concepts described herein can lessen or minimize conflict in transmission direction between symbols of the slot formats that occur at the same or similar times. In one example, network nodes can derive the slot format for one CP type based on the slot format for another CP type and/or based on associated timelines of the CP types. In another example, a network node (e.g., the base station) can configure another network node (e.g., the UE) with the slot formats to use for each CP type (e.g., by specifying an indicator representing the slot format, such as a slot format indicator (SFI) in the configuration), where the slot formats may exhibit some level of compatibility between the types of configured symbols in the slot. In any case, the network nodes can be accordingly configured to communicate multiplexed signals that are based on different CP types and/or associated with different corresponding timelines while decreasing conflict in communication direction between symbols on the multiple timelines.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., Si, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, gNB (e.g., in 5G NR) or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/

LTE-A networks, the term evolved node B (eNB) (e.g., or gNB in 5G networks), etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A media access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different subcarrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In aspects of the wireless communication system 100, one or more of the base stations 105 may include a multiplexing component 240 for multiplexing communications using different CP types for communication according to different timelines, which may be based on a length associated with the CP type. One or more of the UEs 115 may include a communicating component 340 for receiving and decoding multiplexed communications that are based on the different CP types. Additionally, in some examples, the one or more UEs 115 may additionally or alternatively include a multiplexing component 240 to multiplex communications of different CP types, according to aspects described herein, and/or the one or more base stations 105 may include a communicating component 340 for receiving and decoding the multiplexed communications. Moreover, in an example, different UEs 115 may include the multiplexing component 240 and/or communicating component 340 to facilitate UE-to-UE communications, etc.

Figure 2:
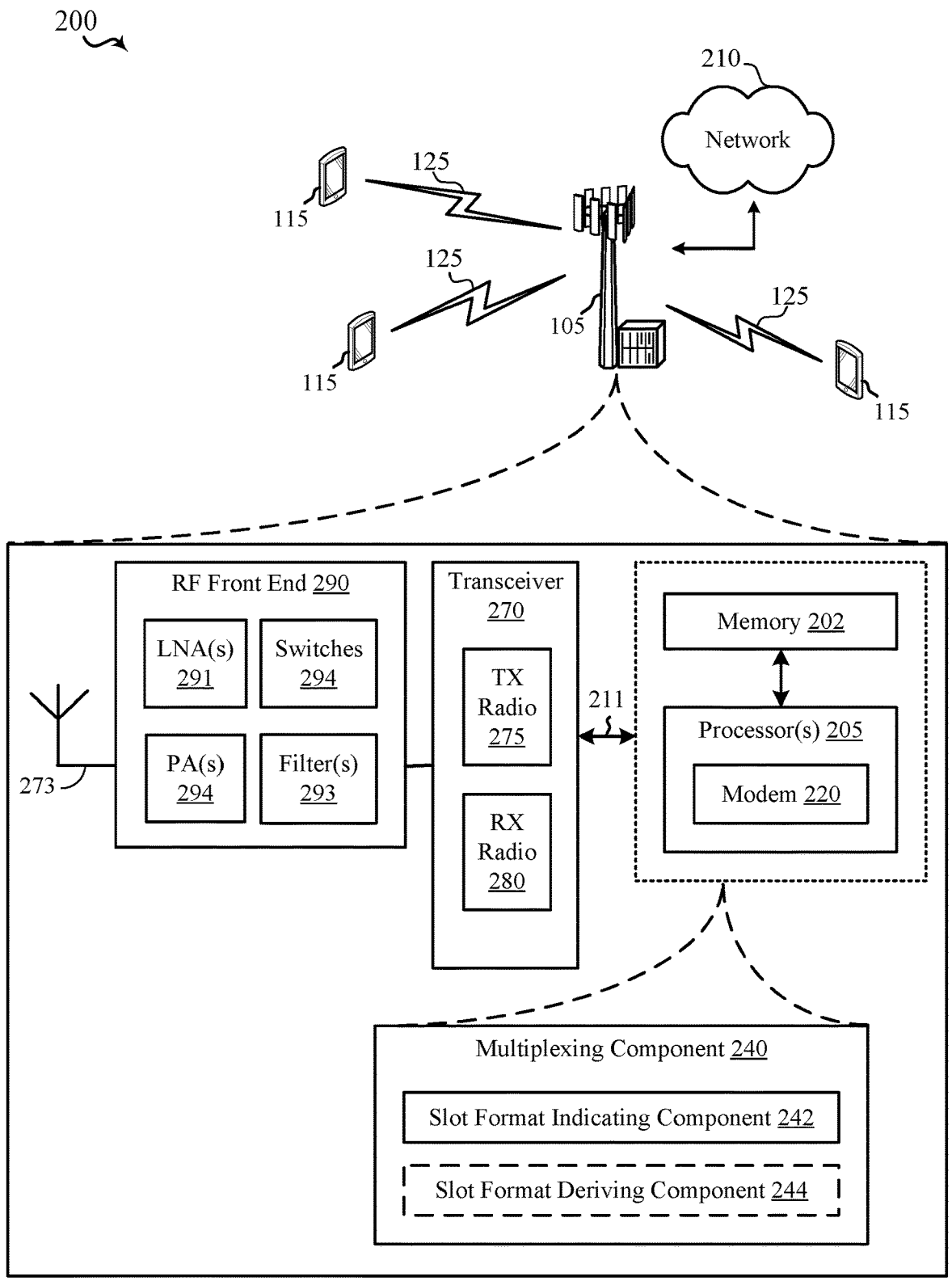
FIG. 2 is a block diagram illustrating an example of a base station, in accordance with various aspects of the present disclosure.
Figure 3:
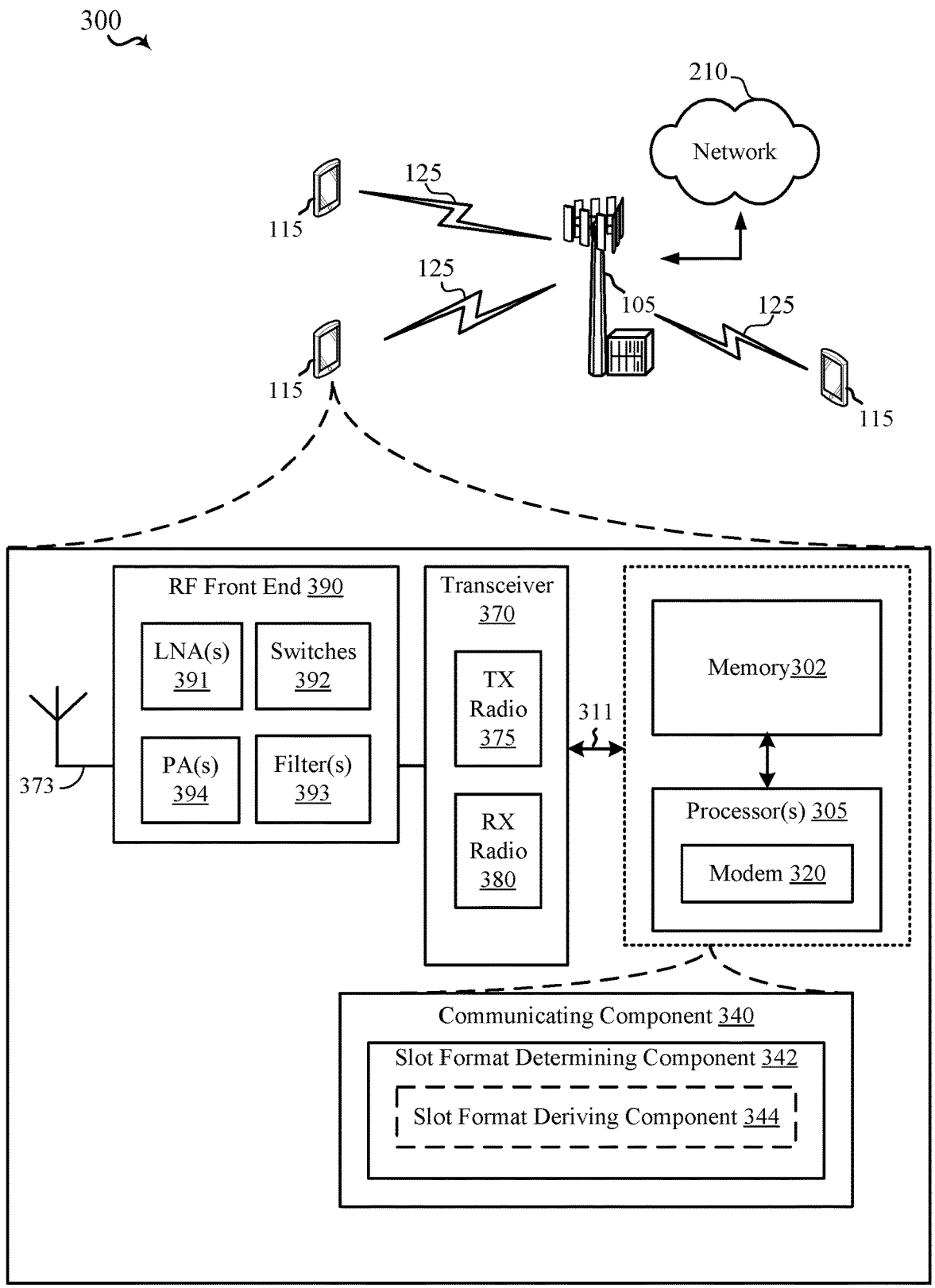
FIG. 3 is a block diagram illustrating an example of a UE, in accordance with various aspects of the present disclosure.
Figure 4:
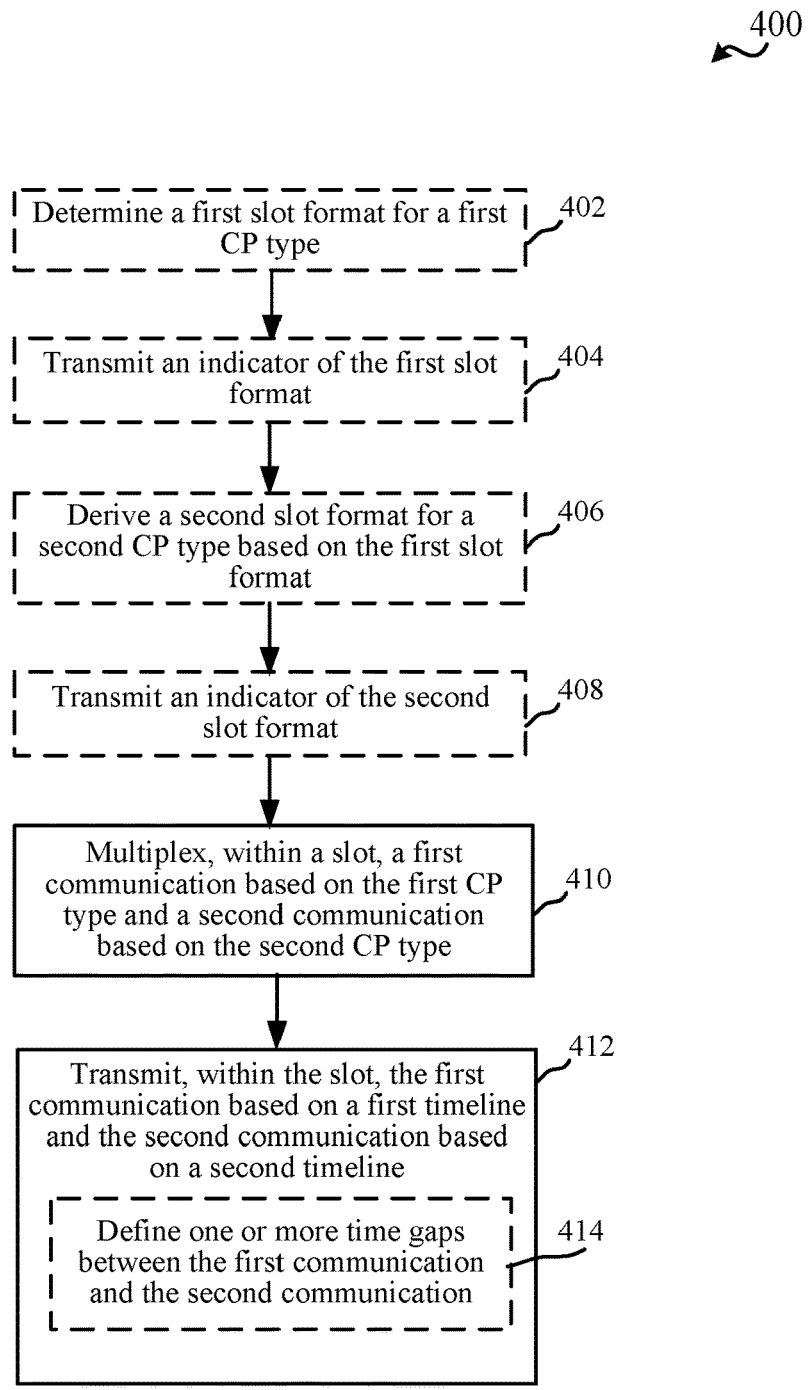
FIG. 4 is a flow chart illustrating an example of a method for multiplexing communications having different cyclic prefix (CP) types, in accordance with various aspects of the present disclosure.
Figure 5:
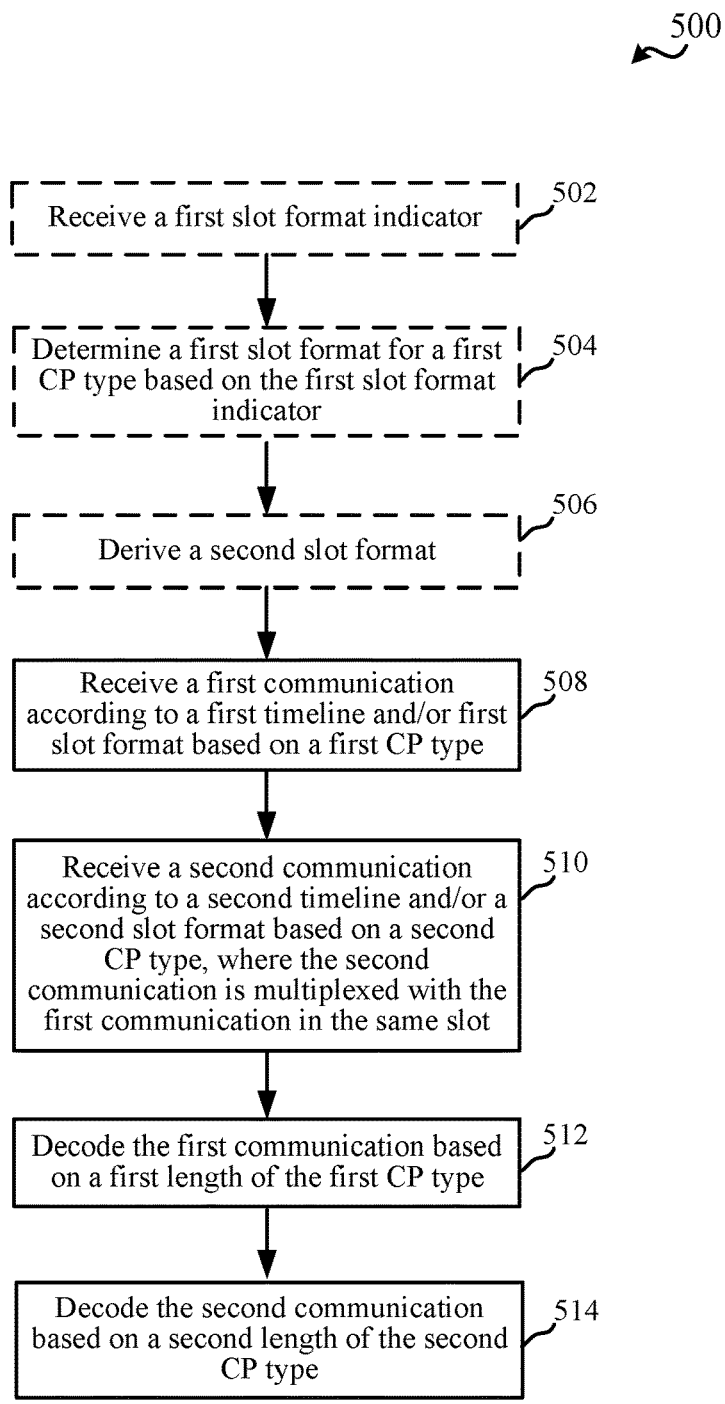
FIG. 5 is a flow chart illustrating an example of a method for receiving communications having different CP types, in accordance with various aspects of the present disclosure.

Turning now to FIGS. 2-8, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, a block diagram 200 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to receive and decode multiplexed communications of different CP types (e.g., communications that may overlap in a time domain). Moreover the base station 105 may be an example of the base stations described in the present disclosure (e.g., eNB, gNB, other types of access points, etc. providing one or more macrocells, small cells, etc.) that are configured to multiplex and transmit communications that use different CP types that may correspond to different communication timelines.

In an aspect, the base station in FIG. 2 may include one or more processors 205 and/or memory 202 that may operate in combination with a multiplexing component 240 to perform the functions, methods (e.g., method 400 of FIG. 4), etc. presented in the present disclosure. In accordance with aspects of the present disclosure, the multiplexing component 240 may include one or more components for multiplexing communications having different CP types (and thus perhaps different communication timelines). In an example, multiplexing component 240 may include a slot format indicating component 242 for indicating a slot format associated with a first CP type, and/or a slot format deriving component 244 for deriving or interpolating (and/or additionally indicating) a second slot format associated with a second CP type.

The one or more processors 205 may include a modem 220 that uses one or more modem processors. The various functions related to the multiplexing component 240, and/or its sub-components, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the multiplexing component 240. In another example, multiplexing component 240 may operate at one or more communication layers, such as a physical layer (e.g., layer 1 (L1)), media access control (MAC) layer (e.g., layer 2 (L2)), PDCP layer or RLC layer (e.g., layer 3 (L3)), etc., to multiplex communications and/or transmit an indication of a slot format for one or more CP types, etc.

In some examples, the multiplexing component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the multiplexing component 240 to the UEs. RF front end 290 may be connected to one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels, transmitting and receiving signals, etc. In an aspect, the components of the RF front end 290 can connect with transceiver 270. The transceiver 270 may connect to one or more of modem 220 and processors 205.

The transceiver 270 maybe configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or multiplexing component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining multiplexing component 240 and/or one or more of its sub-components. Additionally or alternatively, the base station 105 may include a bus 211 for coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 9. Similarly, the memory 202 may correspond to the memory described in connection with the base station in FIG. 9.

Referring to FIG. 3, a block diagram 300 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to receive and decode multiplexed communications of different CP types (e.g., communications that may overlap in a time domain). Moreover the base station 105 may be an example of the base stations described in the present disclosure (e.g., eNB, gNB, other types of access points, etc. providing one or more macrocells, small cells, etc.) that are configured to multiplex and transmit communications that use different CP types that may correspond to different communication timelines.

In an aspect, the UE 115 in FIG. 3 may include one or more processors 305 and/or memory 302 that may operate in combination with a communicating component 340 to perform the functions, methods (e.g., method 500 of FIG. 5), etc., presented in the present disclosure. In accordance with aspects of the present disclosure, the communicating component 340 may include one or more components for receiving and decoding multiplexed communications having different CP types. For example, communicating component 340 can include a slot format determining component 342 for determining a slot format for a received communication related to a first CP type, and/or a slot format deriving component 344 for deriving a slot format for a received communications related to a second CP type. In an example, communicating component 340 can receive and decode communications received according to the first and second CP types.

The one or more processors 305 may include a modem 320 that uses one or more modem processors. The various functions related to the communicating component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the communicating component 340. In another example, communicating component 340 may operate at one or more communication layers, such as physical layer or L1, MAC layer or L2, a PDCP/RLC layer or L3, etc., to receive communications having different CP types, receive slot format indicators for communications related to the one or more of the different CP types, etc.

In some examples, the communicating component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to receive signals that include packets (e.g., and/or one or more related PDUs). RF front end 390 may be connected to one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can connect with transceiver 370. The transceiver 370 may connect to one or more of modem 320 and processors 305.

The transceiver 370 maybe configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or communicating component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining communicating component 340 and/or one or more of its sub-components. Additionally or alternatively, the UE 115 may include a bus 311 for coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 9. Similarly, the memory 302 may correspond to the memory described in connection with the UE in FIG. 9.

FIG. 4 illustrates a flow chart of an example of a method 400 for multiplexing (e.g., by a base station) communications having different CP types. In an example, a UE can also perform the functions described in method 400 and/or include the corresponding components of FIG. 2 to multiplex communications having different CP types.

Optionally, at Block 402, a first slot format for a first CP type can be determined. In an aspect, slot format indicating component 242, e.g., in conjunction with processor(s) 205, memory 202, transceiver 270, multiplexing component 240, etc., can determine a first slot format for a first CP type. For example, slot format indicating component 242 can select the first slot format based on one or more parameters related to communicating with a UE 115, such as a signal strength or quality, a load at the base station 105, a buffer status report from the UE 115 indicating an amount of data to transmit, a quality of service (QoS), bit rate, or other performance metric for one or more links or bearers, etc. For example, the slot format may correspond to defining a number and/or pattern of symbols in a slot for a communication direction (e.g., downlink, uplink, etc.). The slot format may also include one or more flexible symbols that may be dynamically configured for downlink or uplink communications. In an example, a wireless technology, such as 5G NR, may define a number of slot formats that specify a number and/or pattern of downlink, uplink, or flexible symbols in a slot.

For example, FIG. 6 illustrates an example of slot formats 600, 610 that are defined in 5G NR for normal CP. For example, slot format 600 includes three downlink symbols, followed by eight flexible symbols, followed by three uplink symbols, for a total of 14 symbols in the slot. In another example, slot format 610 includes two downlink symbols, followed by a flexible symbol, followed by four uplink symbols, followed by two downlink symbols, followed by a flexible symbol, followed by three uplink symbols for a total of 14 symbols in the slot. In an example, slot format indicating component 242 can select the slot format for a first CP type (e.g., normal CP) based on one or more slot formats defined in a wireless communication technology, such as 5G NR.

Optionally, at Block 404, an indicator for the first slot format can be transmitted. In an aspect, slot format indicating component 242, e.g., in conjunction with processor(s)

205, memory 202, transceiver 270, multiplexing component 240, etc., can transmit the indicator of the first slot format. For example, slot format indicating component 242 can transmit the indicator to one or more UEs 115 by using an indicator in a configuration or related signaling, such as in downlink control information (DCI) in a downlink control channel (e.g., PDCCH), etc. Moreover, in an example, slot format indicating component 242 may determine and/or indicate a communication direction (e.g., downlink or uplink) for the flexible symbols of the slot in a separate configuration. As described, slot format indicating component 242 can determine and/or transmit the indicator semi-statically, dynamically, etc., as the selected format may be UE-specific, group-specific, etc. For example, slot format indicating component 242 can transmit a slot format or related indicator in a radio resource control (RRC) signal, a dedicated control channel communication, and/or the like. In one example, slot format indicating component 242 may indicate an initial slot format and may override the initial slot format with a new slot format in dynamic signaling.

Optionally, at Block 406, a second slot format for a second CP type can be derived based on the first slot format. In an aspect, slot format deriving component 244, e.g., in conjunction with processor(s) 205, memory 202, transceiver 270, multiplexing component 240, etc., can derive the second slot format for the second CP type based on the first slot format. As described further herein, this may include interpolating the second slot format from the first slot format such that one or more symbols are defined in the second slot format for downlink, uplink, flexible, etc. communications based on how symbols are defined in the first slot format. In another example, this may include selecting a slot format for the second CP type that is indicated as compatible with (or otherwise mapped to) the first slot format for the first CP type, and/or the like. In the latter example, the base station 105 can include (e.g., stored in memory 202) a mapping between slot formats for the first CP type (e.g., normal CP) and slot formats for the second CP type (e.g., extended CP) that can be used to multiplex communications.

Moreover, for example, the CP types can have different numerologies, and can thus be associated with different timelines for communications. For example, in 5G NR, communication resources can be defined as a collection of frequency resources (e.g., multiple subcarriers) over a collection of time resources (e.g., multiple OFDM symbols). In an example, in 5G NR, a slot can be defined to include a plurality of OFDM symbols that each have a number of subcarriers determined based on a subcarrier spacing, and the number of OFDM symbols in the slot can be at least partially determined based on a CP type used for the slot (e.g., normal CP, extended CP, etc.) In an example, 5G NR can support OFDM symbol-level time division multiplexing of different CP types, as described herein. Allocation of OFDM symbols in each numerology or CP type can be based on a corresponding OFDM symbol grid, where the OFDM symbol grid can be defined per 0.5 millisecond (ms) duration and repeated every 0.5 ms.

For example, for a subcarrier spacing $SCS_{NCP}=2^{\mu NCP}\cdot 15$ [kHz], a normal CP symbol grid can be defined as:

$$t_k^{NCP} = \begin{cases} 0, & k=0 \\ 16T_s + k\cdot T_{symb}^{NCP}, & \text{otherwise} \end{cases}$$

$$T_s = 1/(30.72\times 10^6)[\text{sec}]$$

-continued $$T_{symb}^{NCP} = (2048+144)T_s/2^{\mu NCP}[\text{sec}]$$

$$k=0,\ldots,7\cdot 2^{\mu NCP}-1 \quad (0.5 \text{ ms span})$$

In another example, for a subcarrier spacing $SCS_{ECP}=2^{\mu ECP}\cdot 15$ [kHz], an extended CP symbol grid can be defined as $$t_k^{ECP}=k\cdot T_{symb}^{ECP}$$

$$T_{symb}^{ECP}=(2048+512)T_s/2^{\mu ECP}$$

$$k=0,\ldots,6\cdot 2^{\mu ECP}-1 (0.5 \text{ ms span})$$

In 5G NR, for example, the same subcarrier spacing (SCS) can be assumed to be configured for different CP types (e.g., $\mu_{NCP}=\mu_{ECP}$), but it can also be possible to configure different SCS for different CP types. In an example, uplink and downlink communications for either CP type can use different SCS within a slot, and/or the different CP types can use different SCS within a slot. In addition, sub-band level frequency division multiplexing of different CP types may be used. In any case, using symbol grids for normal CP and extended CP type communications, as defined above, to determine symbol alignment within a slot and corresponding slot formats can be desirable for coexistence between these signals in 5G NR and normal/extended CP LTE signals.

For example, because the different CP types may have different numbers of symbols per slot (e.g., and thus may be associated with different timelines for a given slot), the symbol boundaries may not align, and deriving slot formats that are compatible (or mostly compatible) in communication direction may be based on logic for resolving possible conflicts where a symbol for one CP type overlaps symbols for the other CP type that have different communication directions (e.g., downlink, uplink, flexible, etc.). In an example, slot format deriving component 244 can derive slot format for the second CP type based on the slot format for the first CP type using this logic, or the slot formats may be associated in a configuration and the association may be based on the logic.

An example is shown in FIG. 6, which illustrates slot formats 600, 610 for normal CP and corresponding slot formats 602, 612 for extended CP that may be defined as compatible with the slot formats 600, 610. As shown, slot formats 600, 610 can be defined based on a numerology of 14 OFDM symbols per slot (e.g., for normal CP) and can correspond, respectively, to slot formats 27 and 55 defined in 5G NR. In addition, for example, slot formats 602, 612 can be defined based on a numerology of 12 OFDM symbols per slot (e.g., for extended CP). In the depicted example, slot formats 600, 602 can have some level of compatibility (or can be said to be compatible) such that at least some symbols in slot format 600 having a certain communication direction (e.g., downlink, uplink, or flexible) overlap, in a time domain, with at least some other symbols in slot format 602 having a similar communication direction. Similarly, slot formats 610, 612 similarly have a level of compatibility. In an example, the slot formats 600, 602 can be defined for 5G NR communication, and can be associated with one another, in a configuration, as compatible slot formats (and similarly slot formats 610, 612). In another example, however, slot format deriving component 244 can interpolate slot format 602 for extended CP based on the determined slot format determined and/or indicated by slot format indicating component 242. The interpolation may be performed based on a set of rules, which may be configured at the base station 105 or UE 115, provided to the UE 115 in a configuration from the base station 105, and/or the like, for example. Using the rules for determining slot format(s), for example, can help to avoid severe inter-symbol/inter-carrier interference between the communications.

Figure 7:
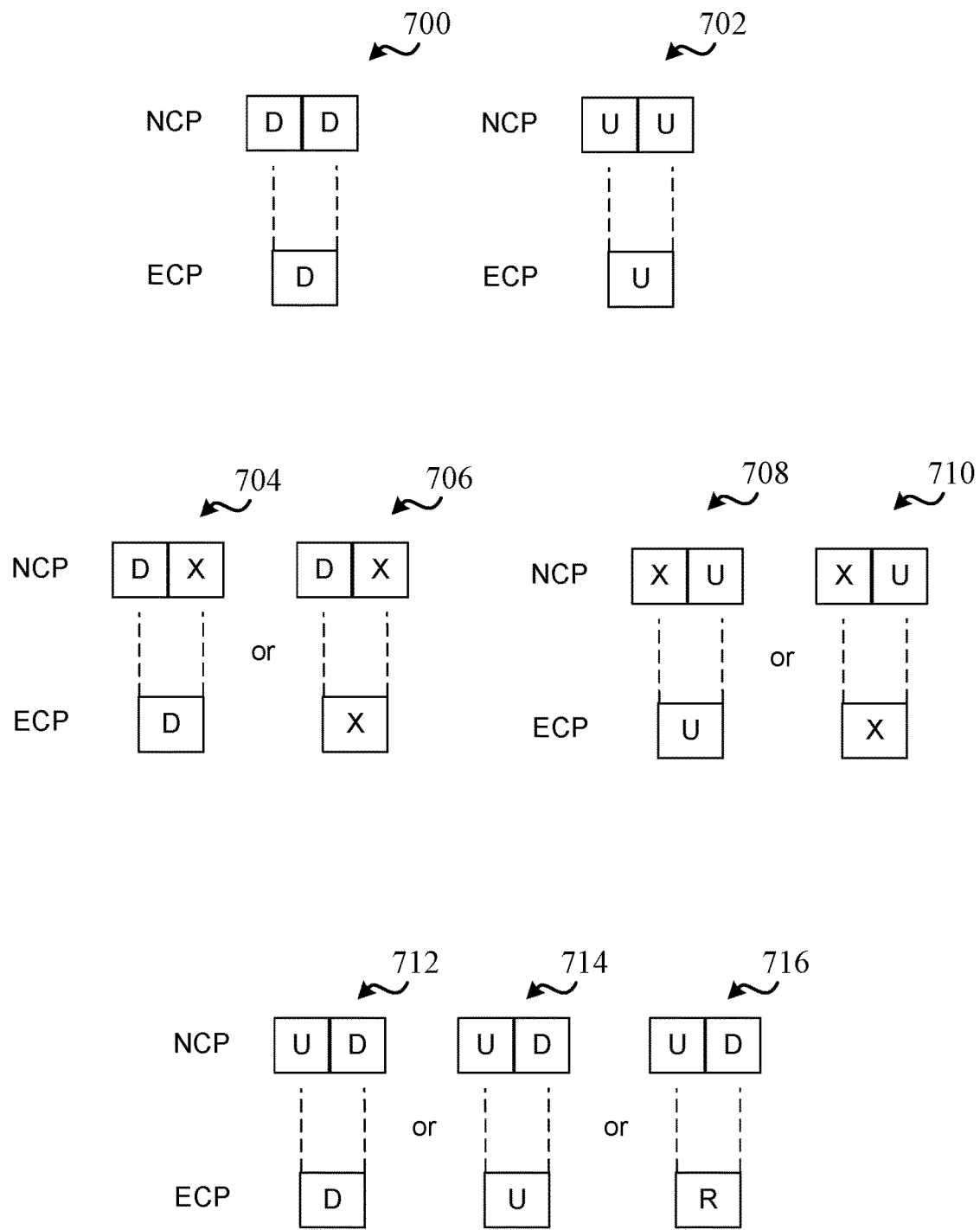
FIG. 7 illustrates examples of partial slot formats for defining rules to interpolate communication directions for symbols, in accordance with various aspects of the present disclosure.

FIG. 7 illustrates partial slot formats depicting examples of rules for determining communication direction for symbols in an extended CP slot format based on a determined or indicated normal CP slot format. For example, as shown at 700, when two downlink symbols in the normal CP slot format overlap a symbol in the extended CP slot format, the symbol in the extended CP slot format can be interpolated as a downlink symbol. For example, as shown at 702, when two uplink symbols in the normal CP slot format overlap a symbol in the extended CP slot format, the symbol in the extended CP slot format can be interpolated as an uplink symbol.

For example, when a downlink symbol and an adjacent flexible symbol in the normal CP slot format overlap a symbol in the extended CP slot format, the symbol in the extended CP slot format can be interpolated as a downlink symbol, as shown at 704, or a flexible symbol, as shown at 706. Similarly, for example, when an uplink symbol and an adjacent flexible symbol in the normal CP slot format overlap a symbol in the extended CP slot format, the symbol in the extended CP slot format can be interpolated as an uplink symbol, as shown at 708, or a flexible symbol, as shown at 710. In an example, rules for determining whether the symbol in the extended slot format is downlink/uplink or flexible may be based on one or more measureable criteria, such as a portion of the symbol in the normal CP slot format that overlaps the symbol in the extended CP slot format (e.g., the symbol in the extended CP format can interpolated as downlink/uplink where more of the downlink/uplink symbol in the normal CP slot format overlaps the symbol in the extended CP format than does the flexible symbol).

In another example, when a downlink symbol and an adjacent uplink symbol in the normal CP slot format overlap a symbol in the extended CP slot format, the symbol in the extended CP slot format can be interpolated as a downlink symbol as shown at 712, an uplink symbol, as shown at 714, or a reserved symbol (e.g., where a reserved symbol can indicate any transmitting or receiving over the symbol is forbidden), as shown at 716. In an example, rules for determining whether the symbol in the extended slot format is downlink, uplink, or reserved may indicate or otherwise be based on one or more measureable criteria, such as a portion of the symbol in the normal CP slot format that overlaps the symbol in the extended CP slot format, an interference criteria, and/or the like. In any case, in a specific example, slot format deriving component 244 can derive slot format 602 from slot format 600, and/or can derive slot format 612 based on slot format 610, using the set of rules. In any case, the derived slot format for the second CP (e.g., extended CP) can have at least some level of compatibility with the first slot format for the first CP (e.g., normal CP) such that at least some overlapping symbols can have at least some portion of time with the same communication direction (or one or more reserved symbols over which communication is not allowed). This can allow transmissions from a base station (or from a UE) that are separately based on the first CP and the second CP to be multiplexed and/or otherwise coexist in a slot. In one example, the base station 105 (e.g., via multiplexing component 240) can configure the UE 115 with the one or more rules, or some indication as to the one or more rules, (e.g., via RRC or higher layer signaling) to ensure the UE 115 can derive the second slot format based on the first slot format as well. In this example, the rules may be UE-specific, based on an indicated UE-capability (e.g., indicated via RRC or higher layer signaling), etc.

Referring back to FIG. 4, optionally at Block 408, an indicator for the second slot format can be transmitted. In an aspect, slot format deriving component 244, e.g., in conjunction with processor(s) 205, memory 202, transceiver 270, multiplexing component 240, etc., can transmit the indicator of the second slot format. For example, slot format deriving component 244 can transmit the indicator to one or more UEs 115 by using an indicator in a configuration or related signaling, such as in downlink control information (DCI) in a downlink control channel (e.g., PDCCH), a value map with values indicating a communication direction for each symbol in the second slot format, etc.

In method 400, at Block 410, a first communication based on the first CP type and a second communication based on the second CP type can be multiplexed within a slot. In an aspect, multiplexing component 240, e.g., in conjunction with processor(s) 205, memory 202, transceiver 270, etc., can multiplex, within the slot, the first communication based on the first CP type and the second communication based on the second CP type. As described, the first communication may be prepared for transmission based on a first slot format and timeline associated with the first CP, such that the first communication can be prepared for transmission in a symbol with an appropriate communication direction (e.g., downlink for base station 105 transmissions or uplink for UE 115 transmissions). Similarly, the second communication may be prepared for transmission based on a second slot format and timeline associated with the second CP, such that the second communication can be prepared for transmission in a symbol with an appropriate communication direction (e.g., downlink for base station 105 transmissions or uplink for UE 115 transmissions). The first and second communications can be multiplexed for transmission in the same slot. In one specific example, the first and second communications may overlap in a time domain within the slot and their corresponding symbols may be associated with the same communication direction based on the defined slot formats.

In method 400, at Block 412, within the slot, the first communication can be transmitted based on a first timeline and the second communication can be transmitted based on a second timeline. In an aspect, multiplexing component 240, e.g., in conjunction with processor(s) 205, memory 202, transceiver 270, etc., can transmit, within the slot, the first communication based on the first timeline and the second communication based on the second timeline. In this regard, the first communication and second communication can be transmitted in symbols of the first and second timelines, respectively, that can occur within the same slot. Additionally, as described, the base station 105 can include components to additionally receive a multiplexed first communication (based on a first CP type) and second communication (based on a second CP type) from a UE 115 within the slot.

In an example, transmitting the first and second communication at Block 412 may optionally include, at Block 414, defining one or more time gaps between the first communication and the second communication. In an aspect, multiplexing component 240, e.g., in conjunction with processor(s) 205, memory 202, transceiver 270, etc., can define the one or more time gaps between the first communication and the second communication. For example, multiplexing component 240 can define the one or more time gaps, during which communications can be prohibited, to somewhat align the first communication with the first timeline (e.g., with a symbol boundary of the first timeline) and/or the second communication with the second timeline (e.g., with a symbol boundary of the second timeline) to minimize occurrence of conflicting symbol directions in respective slot formats. An example is shown in FIG. 8.

Figure 8:
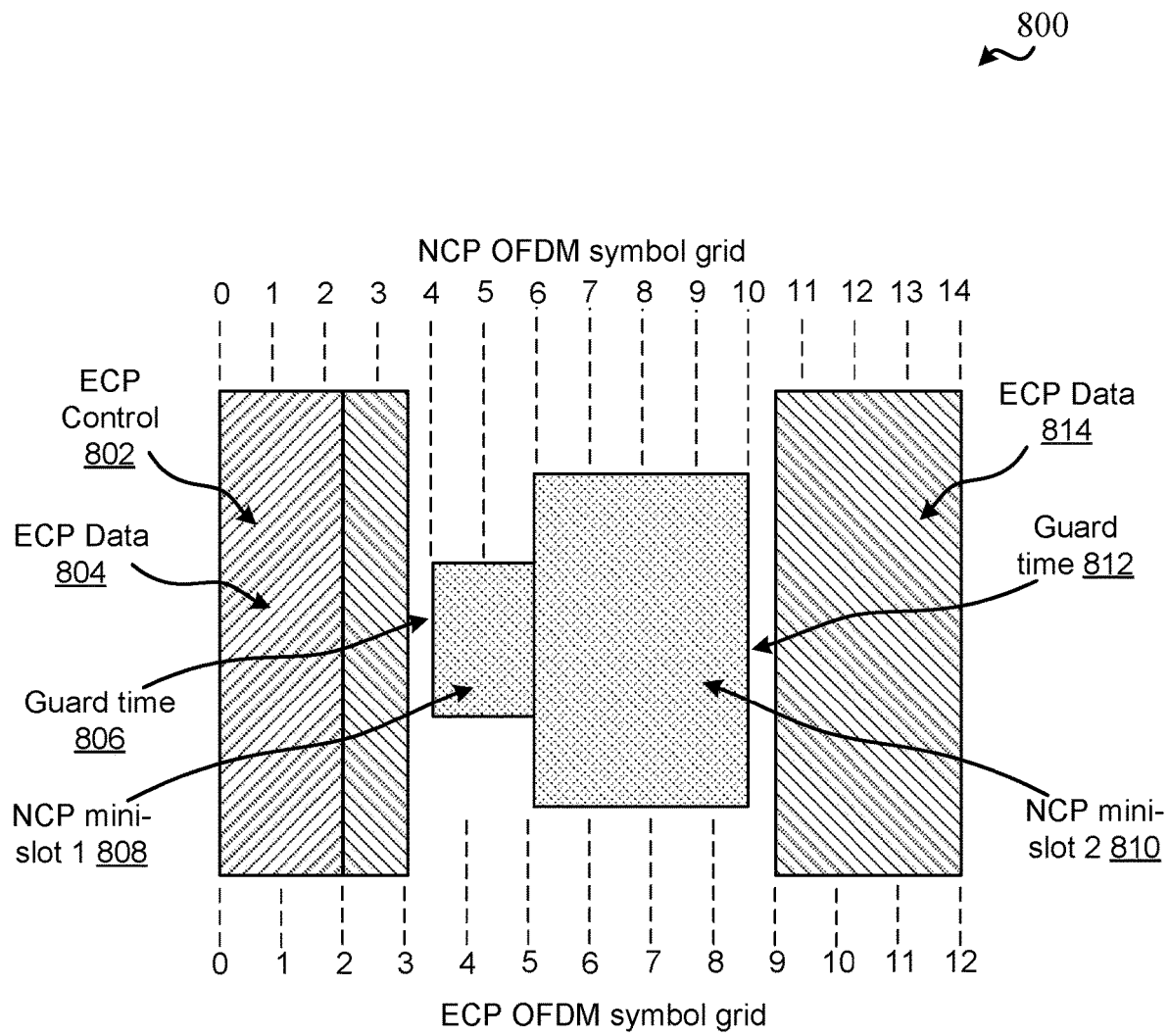
FIG. 8 illustrates an example of a timeline for multiplexing communications based on different CP types, in accordance with various aspects of the present disclosure.

FIG. 8 illustrates an example of a timeline 800 for communicating based on a first timeline for a normal CP type (including 14 OFDM symbols) and a second timeline for an extended CP type (including 12 OFDM symbols). In this example, after transmitting extended CP (ECP) control 802 and ECP data 804 in the first three symbols of the extended CP timeline, multiplexing component 240 can define the time gap (e.g., guard time 806) before transmitting normal CP (NCP) communications 808 to align the communications 808 at a fifth symbol of the NCP timeline, and NCP communications 810 at the seventh symbol. As shown, the time gap can include a fraction of an OFDM symbol in one timeline or the other such to align with the next OFDM symbol boundary. Similarly, multiplexing component 240 can define the time gap (e.g., guard time 812) before transmitting additional ECP data 814 to align the ECP data 814 with the tenth symbol of the ECP timeline.

FIG. 5 illustrates a flow chart an example of a method 500 for receiving and/or decoding (e.g., by a UE) communications having different CP types. In an example, a base station can also perform the functions described in method 500 and/or include the corresponding components of FIG. 3 to receive and decode multiplexed communications having different CP types.

In method 500, optionally at Block 502, a first slot format indicator can be received. In an aspect, slot format determining component 342, e.g., in conjunction with processor(s) 305, memory 302, transceiver 370, communicating component 340, etc., can receive the first slot format indicator. For example, slot format determining component 342 can receive the first slot format indicator from a configuration, in a control channel communication (e.g., from a base station 105), and/or the like. In one example, as described, the indicator may be a value indicated in a configuration, where the value may correspond to a slot format defined in 5G NR (e.g., slot format 27 or 55, as shown in FIG. 6). In another example, the indicator may include a value map where each value indicates whether a corresponding symbol in the slot is downlink, uplink, flexible, etc. As described, slot format determining component 342 can receive or otherwise determine the indicator semi-statically, dynamically, etc. (e.g., in RRC signaling, dedicated control signaling, etc.), as the selected format may be UE-specific, group-specific, etc.

In method 500, optionally at Block 504, a first slot format for a first CP type can be determined based on the first slot format indicator. In an aspect, slot format determining component 342, e.g., in conjunction with processor(s) 305, memory 302, transceiver 370, communicating component 340, etc., can determine the first slot format for the first CP type based on the first slot format indicator. For example, the slot format determining component 342 can determine a communication direction (e.g., downlink, uplink, flexible, etc.) for each symbol in a slot based on the slot format indicator. In addition, in an example, the slot format determining component 342 may determine a communication for the flexible symbols based on a separate configuration (e.g., from the base station 105, etc.). The symbols can be aligned with a symbol grid corresponding to the first CP type (e.g., based on a number of symbols configured for the first CP type).

In method 500, optionally at Block 506, a second slot format can be derived. In an aspect, slot format deriving component 344, e.g., in conjunction with processor(s) 305, memory 302, transceiver 370, communicating component 340, etc., can derive the second slot format. For example, the slot format deriving component 344 can derive the second slot format based on the first slot format (e.g., based on one or more rules as described with reference to FIGS. 6 and 7). In an example, in this regard, the base station 105 and the UE 115 can use the same or a similar set of rules, as described above, to derive the second slot format based on the first slot format to ensure the base station 105 and UE 115 derive the same slot formats. In one example, slot format deriving component 344 can receive the set of rules, or some indicator as to the set of rules, (e.g., via RRC or higher layer signaling) from the base station 105. In an example, in this regard, the set of rules may be UE-specific and/or based on an indicated UE capability (e.g., indicated via RRC or higher layer signaling). In another example, slot format deriving component 344 can derive the second slot format based on a separate slot format indicator configured for the second slot format (e.g., received in a configuration from a base station 105, which may include a value indicating the format, a value map indicating a communication direction for each symbol in the slot, etc.).

In addition, the first slot format can relate to communications using a first CP type, and the second slot format can relate to communications using a second CP type. Moreover, in this regard, the first slot format can be based on a first timeline associated with the first CP type and the second slot format can be based on a second timeline associated with the second CP type, where the first and second timelines may be different based on having a different number of symbols per slot. The symbols can be aligned with a symbol grid corresponding to the second CP type (e.g., based on a number of symbols configured for the second CP type). As described, the symbol grids for the first and second CP types may not be aligned within a slot. In any case, the UE and base station can communicate based on the determined symbol locations and communication directions.

For example, this can include, at Block 508, receiving a first communication according to a first timeline and/or first slot format based on a first CP type. In an aspect, communicating component 340, e.g., in conjunction with processor(s) 305, memory 302, transceiver 370, etc., can receive the first communication (e.g., a transmission from the base station 105) according to a first timeline and/or first slot format based on a first CP type (e.g., based on determining the symbol is a downlink symbol for the first CP type). As described, the first slot format for the first CP type can include symbols with a specified communication direction, and the communicating component 340 can receive the first communication in the symbol having the appropriate communication direction (e.g., downlink for a UE receiving the signal or uplink for a base station receiving the signal).

Communicating based on the determined symbol locations and communication directions may also include, at Block 510, receiving a second communication according to a second timeline and/or second slot format based on a second CP type, where the second communication is multiplexed with the first communication in the same slot. In an aspect, communicating component 340, e.g., in conjunction with processor(s) 305, memory 302, transceiver 370, etc., can receive the second communication (e.g., another transmission) according to the second timeline and/or second slot format based on the second CP type (e.g., based on determining the symbol is a downlink symbol for the second CP type). The second communication can be multiplexed with the first communication in the same slot, as described, and may thus be transmitted in symbols of respective timelines, which may have a same communication direction (e.g., downlink for a UE receiving the signal or uplink for a base station receiving the signal). As described, the second slot format for the second CP type can include symbols with a specified communication direction, which may overlap in time with symbols of the first slot format having the same specified communication direction. Thus, the communicating component 340 can receive the first communication in a first symbol according to the first timeline and the second communication in a second symbol according to the second timeline, which may have the same communication direction and/or may overlap in a time domain or otherwise (e.g., downlink for a UE receiving the signal or uplink for a base station receiving the signal). In one example, communicating component 340 can receive the first and second communications subject to one or more time gaps, as described in reference to FIG. 8, that can separate the communications such that the communications can align with appropriate symbol boundaries for their associated timelines defined based on their associated CP types. Additionally, as described, the UE 115 can include components to additionally transmit, within the slot, a multiplexed first communication (based on a first CP type) and second communication (based on a second CP type) to the base station 105.

In method 500, at Block 512, the first communication can be decoded based on a first length of the first CP type, and at Block 514, the second communication can be decoded based on a second length of the second CP type. In an aspect, communicating component 340, e.g., in conjunction with processor(s) 305, memory 302, transceiver 370, etc., can decode the first communication based on the first length of the first CP type and can decode the second communication based on the second length of the second CP type. For example, communicating component 340 can use the appropriate length of the given CP to verify the received signal and/or to determine missing data from the beginning of the signal based on data at the end of the signal corresponding to the CP length.

Figure 9:
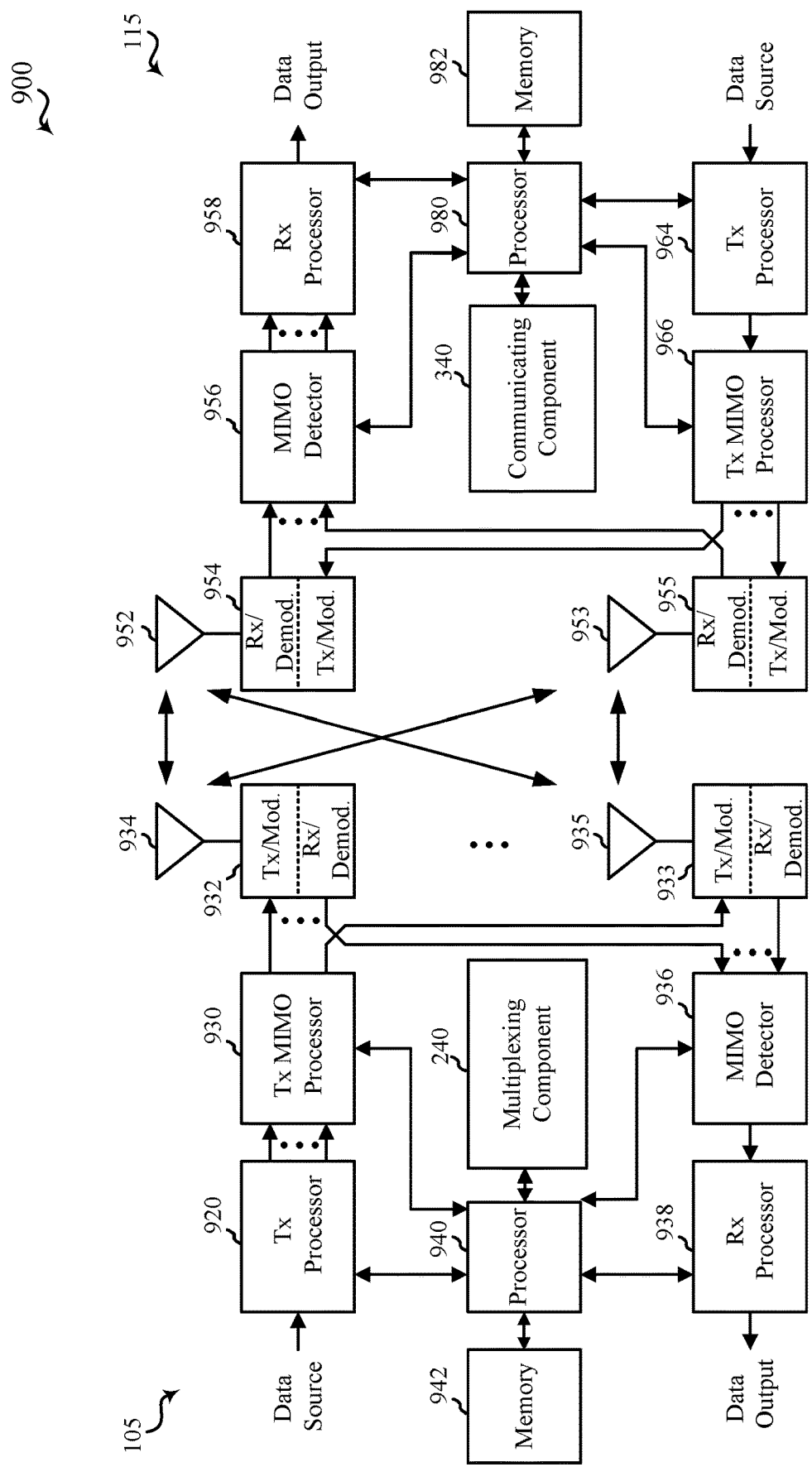
FIG. 9 is a block diagram illustrating an example of a MIMO communication system including a base station and a UE, in accordance with various aspects of the present disclosure.

FIG. 9 is a block diagram of a MIMO communication system 900 including a base station 105 and a UE 115. The MIMO communication system 900 may illustrate aspects of the wireless communication system 100 described with reference to FIG. 1. The base station 105 may be an example of aspects of the base station 105 described with reference to FIGS. 1-3. The base station 105 may be equipped with antennas 934 and 935, and the UE 115 may be equipped with antennas 952 and 953. In the MIMO communication system 900, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 115 may be an example of aspects of the UEs 115 described with reference to FIGS. 1-3. At the UE 115, the UE antennas 952 and 953 may receive the DL signals from the base station 105 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 115 to a data output, and provide decoded control information to a processor 980, or memory 982.

The processor 980 may in some cases execute stored instructions to instantiate a communicating component 340 (see e.g., FIGS. 1 and 3).

On the uplink (UL), at the UE 115, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 105 in accordance with the communication parameters received from the base station 105. At the base station 105, the UL signals from the UE 115 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a multiplexing component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 900.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   receiving a slot format indicator indicating a first slot format for communications of a first cyclic prefix (CP) type, wherein the first slot format indicates, for each of a first set of multiple symbols, a communication direction;
   receiving, in one or more of the first set of multiple symbols indicated in the first slot format as a downlink symbol, a first communication according to a first timeline, wherein the first timeline is associated with the first CP type;
   receiving, in a second set of one or more symbols determined, based on a second slot format for communications of a second CP type, as a downlink symbol, a second communication according to a second timeline that is associated with the second CP type, wherein the second slot format is based on the first slot format and indicates, for each of the second set of one or more symbols, a communication direction, and wherein the second CP type is associated with having a less number of symbols than the first CP type;
   decoding the first communication according to a first length of the first CP type; and
   decoding the second communication according to a second length of the second CP type.

2. The method of claim 1, wherein the communication direction for each symbol in the first set of multiple symbols and each symbol in the second set of multiple symbols is one of uplink, downlink, or flexible.

3. The method of claim 1, wherein receiving the slot format indicator includes receiving the slot format indicator in radio resource control signaling from a base station.

4. The method of claim 1, wherein the second slot format is further based on receiving, from a base station, a second slot format indicator.

5. The method of claim 1, further comprising determining the second slot format to comply with the first slot format such that:
   one or more first slot format downlink symbols assigned for receiving downlink communications in the first slot format at least partially overlap in a time domain with one or more second slot format downlink symbols in the second slot format; and one or more first slot format uplink symbols assigned for transmitting uplink communications in the first slot format at least partially overlap in the time domain with one or more second slot format uplink symbols in the second slot format.

6. The method of claim 5, wherein the second slot format is interpolated from the first slot format based on the second timeline.

7. The method of claim 1, further comprising receiving a configuration comprising one or more rules for interpolating the second slot format, wherein the second slot format is based at least in part on the one or more rules.

8. The method of claim 1, wherein at least one of the first slot format or the second slot format include one or more guard periods between a first symbol in the first timeline and a second symbol in the second timeline during which communications are prohibited according to the at least one of the first slot format or the second slot format.

9. The method of claim 1, further comprising receiving a second slot format indicator from which a second slot format is derived.

10. The method of claim 1, further comprising:
decoding the first communication based on a first subcarrier spacing associated with the first CP type; and
decoding the second communication based on a second subcarrier spacing associated with the second CP type, wherein the first subcarrier spacing is different than the second subcarrier spacing.

11. A method for wireless communication, comprising:
transmitting a slot format indicator indicating a first slot format for communications of a first cyclic prefix (CP) type, wherein the first slot format indicates, for each of a first set of multiple symbols, a communication direction;
transmitting a first communication, according to a first timeline corresponding to the first CP type and the first slot format; and
transmitting a second communication according to a second timeline corresponding to a second CP type and a second slot format, wherein the second slot format is based on the first slot format and indicates, for each of a second set of one or more symbols, a communication direction, and wherein the second CP type is associated with having a less number of symbols than the first CP type.

12. The method of claim 11, wherein the communication direction for each symbol in the first set of multiple symbols and each symbol in the second set of multiple symbols is one of uplink, downlink, or flexible.

13. The method of claim 11, wherein transmitting the slot format indicator includes transmitting the slot format indicator in radio resource control signaling.

14. The method of claim 11, wherein the second slot format is further based on receiving, from a base station, a second slot format indicator.

15. The method of claim 11, further comprising determining the second slot format to comply with the first slot format such that:
one or more first slot format downlink symbols assigned for receiving downlink communications in the first slot format at least partially overlap in a time domain with one or more second slot format downlink symbols in the second slot format; and
one or more first slot format uplink symbols assigned for transmitting uplink communications in the first slot format at least partially overlap in the time domain with one or more second slot format uplink symbols in the second slot format.

16. An apparatus for wireless communication, comprising:
a transceiver;
a memory configured to store instructions; and
one or more processors communicatively coupled with the transceiver and the memory, wherein the one or more processors are configured to:
receive a slot format indicator indicating a first slot format for communications of a first cyclic prefix (CP) type, wherein the first slot format indicates, for each of a first set of multiple symbols, a communication direction;
receive, in one or more of the first set of multiple symbols indicated in the first slot format as a downlink symbol, a first communication according to a first timeline, wherein the first timeline is associated with the first CP type;
receive, in a second set of one or more symbols determined, based on a second slot format for communications of a second CP type, as a downlink symbol, a second communication according to a second timeline that is associated with the second CP type, wherein the second slot format is based on the first slot format and indicates, for each of the second set of one or more symbols, a communication direction, and wherein the second CP type is associated with having a less number of symbols than the first CP type;
decode the first communication according to a first length of the first CP type; and
decode the second communication according to a second length of the second CP type.

17. The apparatus of claim 16, wherein the communication direction for each symbol in the first set of multiple symbols and each symbol in the second set of multiple symbols is one of uplink, downlink, or flexible.

18. The apparatus of claim 16, wherein the one or more processors are configured to receive the slot format indicator in radio resource control signaling from a base station.

19. The apparatus of claim 16, wherein the second slot format is further based on receiving, from a base station, a second slot format indicator.

20. The apparatus of claim 16, wherein the one or more processors are further configured to determine the second slot format to comply with the first slot format such that:
one or more first slot format downlink symbols assigned for receiving downlink communications in the first slot format at least partially overlap in a time domain with one or more second slot format downlink symbols in the second slot format; and
one or more first slot format uplink symbols assigned for transmitting uplink communications in the first slot format at least partially overlap in the time domain with one or more second slot format uplink symbols in the second slot format.

21. The apparatus of claim 20, wherein the second slot format is interpolated from the first slot format based on the second timeline.

22. The apparatus of claim 16, wherein the one or more processors are further configured to receive a configuration comprising one or more rules for interpolating the second slot format, wherein the second slot format is based at least in part on the one or more rules.

23. The apparatus of claim 16, wherein at least one of the first slot format or the second slot format include one or more guard periods between a first symbol in the first timeline and a second symbol in the second timeline during which communications are prohibited according to the at least one of the first slot format or the second slot format.

24. The apparatus of claim 16, wherein the one or more processors are further configured to receive a second slot format indicator from which a second slot format is derived.

25. The apparatus of claim 16, wherein the one or more processors are further configured to:
  decode the first communication based on a first subcarrier spacing associated with the first CP type; and
  decode the second communication based on a second subcarrier spacing associated with the second CP type, wherein the first subcarrier spacing is different than the second subcarrier spacing.

26. An apparatus for wireless communication, comprising:
  a transceiver;
  a memory configured to store instructions; and
  one or more processors communicatively coupled with the transceiver and the memory, wherein the one or more processors are configured to:
    transmit a slot format indicator indicating a first slot format for communications of a first cyclic prefix (CP) type, wherein the first slot format indicates, for each of a first set of multiple symbols, a communication direction;
    transmit a first communication, according to a first timeline corresponding to the first CP type and the first slot format; and
    transmit a second communication according to a second timeline corresponding to a second CP type and a second slot format, wherein the second slot format is based on the first slot format and indicates, for each of a second set of one or more symbols, a communication direction, and wherein the second CP type is associated with having a less number of symbols than the first CP type.

27. The apparatus of claim 26, wherein the communication direction for each symbol in the first set of multiple symbols and each symbol in the second set of multiple symbols is one of uplink, downlink, or flexible.

28. The apparatus of claim 26, wherein the one or more processors are configured to transmit the slot format indicator in radio resource control signaling.

29. The apparatus of claim 26, wherein the second slot format is further based on transmitting a second slot format indicator.

30. The apparatus of claim 26, wherein the one or more processors are further configured to determine the second slot format to comply with the first slot format such that:
  one or more first slot format downlink symbols assigned for receiving downlink communications in the first slot format at least partially overlap in a time domain with one or more second slot format downlink symbols in the second slot format; and
  one or more first slot format uplink symbols assigned for transmitting uplink communications in the first slot format at least partially overlap in the time domain with one or more second slot format uplink symbols in the second slot format.

\* \* \* \* \*